United States Patent [19]

Morrone et al.

[11] Patent Number: 5,208,459
[45] Date of Patent: May 4, 1993

[54] METHOD AND APPARATUS FOR READING-OUT A PHOTOSTIMULABLE PHOSPHOR PANEL

[75] Inventors: Luciano Morrone, Carcare; Alfredo Viglienzoni, Savona, both of Italy

[73] Assignee: Minnesota Mining and Manufacturing Company, St. Paul, Minn.

[21] Appl. No.: 770,555

[22] Filed: Oct. 3, 1991

[30] Foreign Application Priority Data

Oct. 5, 1990 [IT] Italy .................. 21647 A/90

[51] Int. Cl.$^5$ ............................. G01N 23/04
[52] U.S. Cl. ...................... 250/327.2; 250/484.1
[58] Field of Search ............ 250/484.1 B, 327.2 D, 250/327.2 B, 327.2 E, 327.2 F

[56] References Cited

U.S. PATENT DOCUMENTS

| | | | |
|---|---|---|---|
| 4,752,557 | 6/1988 | Tsuchino et al. | 250/484.1 B |
| 4,950,895 | 8/1990 | Reinfelder | 250/327.2 E |
| 5,038,037 | 8/1991 | Saotome | 250/484.1 B |

FOREIGN PATENT DOCUMENTS

0051460A3 10/1980 European Pat. Off. .
0077677A3 10/1982 European Pat. Off. .

*Primary Examiner*—Paul M. Dzierzynski
*Assistant Examiner*—Richard Hanig
*Attorney, Agent, or Firm*—Gary L. Griswold; Walter N. Kirn; Mark A. Litman

[57] ABSTRACT

A method for reading-out a radiation image stored in a structured type photostimulable phosphor panel, wherein the phosphor is in a plurality of cells ordered in parallel rows in an inert substrate, comprising the steps of:

photostimulating contemporaneously and uniformly along a scanning line all the cells belonging to the same row, causing each cell in said row to emit light according to the energy stored therein, collecting the emitted light and converting it into electrical signals, processing contemporaneously and separately the light emitted by each cell along the scanning line.

15 Claims, 1 Drawing Sheet

METHOD AND APPARATUS FOR READING-OUT A PHOTOSTIMULABLE PHOSPHOR PANEL

FIELD OF THE INVENTION

The present invention relates to a method and apparatus for reading-out a radiation generated latent image stored on a photostimulable phosphor panel of the structured type, wherein the phosphor is filled into a plurality of cells ordered in parallel rows in an inert substrate.

BACKGROUND OF THE ART

At present, methods for reading-out panels of photostimulable phospors (also called storage phosphors) are based on scanning the panel with a laser beam. The beam, focused onto a scanning plane containing the phosphor panel, is moved back and forth along the scanning line while the panel translates in a direction perpendicular to the scanning line.

Light emitted point by point by the panel is collected by optical means and transferred to a photodetector which produces corresponding electrical signals. The electrical signals are amplified, filtered and sampled according a suitable means (e.g., a clock) fixing the distance between adjacent points. This information is than stored in a computer memory.

Reading-out methods of this type are described, for example, in EP-A-0077677 and EP-A-0051460.

The use of such reading-out methods for reading-out structured phosphor panels does not give satisfactory results. In fact, it may happen that the sampled signal that is emitted corresponding to the center of the cell (wherein the output is maximum), or that emitted corresponding to the border of the cell (wherein the output is minimum), or even that signal read as emitted corresponding to the inert substrate (wherein the output is obviously null). The image formation therefore can be highly altered. Moreover, interference phenomena may seriously damage the image quality.

To obviate these problems, it is theoretically possible to spatially synchronize the sampling. However, that procedure is highly difficult to realize in practice, due to the disuniform speed with which the laser beam runs along the scanning line.

DETAILED DESCRIPTION OF THE INVENTION

In a first aspect, the present invention relates to a method of reading-out a radiation image stored on a structured photostimulable phosphor panel, wherein the phosphor is in a plurality of cells ordered in parallel rows in an inert substrate, said method comprising at least the following steps:

contemporaneously photostimulating along a scanning line all the cells belonging to the same row to cause each cell in said row to emit light according to the energy stored therein, collecting the light emitted from the cells and converting it into electrical signals, contemporaneously and separately processing the light emitted by each cell along the scanning line, repeating the above steps for cells of an adjacent row by shifting the panel relative to the scanning line. These steps are then repeated for the whole panel.

The contemporaneous photostimulation of an entire scanning line and the collection of the light emitted separately by each phosphor cell eliminate the movement of the laser beam along the scanning line and the consequent sampling. The image acquisition is obtained not by a sampling during the time, but by the structure itself of the panel (wherein the image is already stored by points) and by the detector itself which is structured in such a way as to discriminate single points, such as, for example, a (mono- or bi-functional) CCD (i.e., a Charge Coupled Device) or contact sensors made of amorphous materials.

Furthermore, the reading-out method of this invention gives other considerable advantages.

A first advantage is that the total time of reading-out the panel may be shortened and/or, at choice, that the stimulating and reading-out time of each cell may be lengthened.

In fact, with the conventional screen reading methods the reading-out of a non structured phosphor panel comprises the reading-out in sequence, one at a time, each and every point (or pixel) which comprises the image and which as a matter of fact are resolved by the sampling. If said points are n×m (m rows having each n points) and to is the time dedicated to each point for stimulation and reading-out, the total reading-out time $T_o$ will be $$T_o = n \times m \times t_o \qquad (I)$$

If, on the contrary, the method of this invention and a structured phosphor panel are used, under the same resolution (that is with a structured panel having m rows with each n cells), the total reading-out time T1 will be $$T1 = m \times t1 \qquad (II)$$

wherein t1 is the time dedicated to each cell. The number n of cells in each row does not appear because said cells are processed simultaneously.

By comparing formulas I and II, it is possible to verify immediately that:
under the same total time T, the time t dedicated to each cell is increased by a factor n;
under the same time t dedicated to each cell, the total time T is reduced by a factor n.

It is worth noticing that with the normal dimensions of phosphor panels and with the resolution necessary for use in radiography, n has a value usually comprised between 2,000 and 5,000 points per row, and that said advantages are extraordinarily high, even with the rapid movement and response of laser scanners.

In particular, using the method of this invention, it will be possible to obtain unusually short total reading-out times. It is also possible to use slow phosphors (that is phosphors which, upon stimulation, release light in a relatively long time) which usually are not employed in storage systems (such as zinc sulfides (ZnS) and strontium sulfides (SrS), or both) to obtain shorter total reading-out times even when using slow phosphors.

A further important advantage of the method of this invention is that it can be carried out with fixed light emitting means. The delicate moving and position altering means necessary for moving the laser beam back and forth along the scanning line can be completely eliminated. It is also worth noticing the total signal/-noise improvement, because, having longer time for collecting the light of each cell, it is possible to collect a higher portion of the energy stored into the panel.

In another aspect, the present invention relates to an apparatus for carrying out the above described process. Said apparatus comprises means for photostimulating the panel along the scanning line, including a photostimulating light source, means for supporting and translating the panel in a scanning plane containing the scanning line, means for collecting the light emitted by the panel, means for converting the light into electrical signals, and the apparatus is characterized by the photostimulating means comprising means for focusing contemporaneously and uniformly the photostimulating light onto all the cells belonging to the same row along the scanning line, and by the fact that said converting means convert contemporaneously and separately the light emitted by each photostimulated cell.

Because it is not necessary to carry out a scanning, a monocromatic source of light it is not necessary; it is sufficient that the light source gives enough power in the wavelength band to which the phosphor of the panel is sensitive to stimulation. Accordingly, the light source may be advantageously a simple rectilinear quartz-iodine (QI) lamp, or an array of photodiodes, light emitting diodes (LED) or electroluminescent means. In particular cases, however, a laser beam could be preferred.

Optical means for contemporaneously and uniformly focusing the photostimulating light onto the scanning line can comprise either conventional lens systems, or optical fiber bundles, or microlens arrays of the type called Selfoc TM manufactured by Nippon Sheet Glass Company), or combinations thereof. In the case of the light source being a laser beam, the optical means can comprise advantageously a plurality of prismatic lenses, to enlarge the dot-like laser beam to embrace the whole scanning line. An embodiment equally advantageous can be the use of a system comprising optical fibers and an elliptical mirror wherein the expanded laser beam is caused to enter the fibers, giving a uniformly lighted row.

Collection means can comprise either conventional lens systems, or optical fiber bundles, or Selfoc TM microlenses. In the case of optical fibers and Selfoc TM microlenses, at least one optical fiber or at least one Selfoc TM microlenses must be provided for each cell belonging to the row along the scanning line, to assure that light signals arising from different cells remain separated.

Conversion means can comprise either CCD, or contact photodiodes, in the form of linear arrays. To maintain separated the light signals of various cells, is naturally necessary to provide at least one CCD or at least one photodiode for each cell of the panel belonging to the row along the scanning line.

DESCRIPTION OF THE PREFERRED EMBODIMENT

Figure 1:
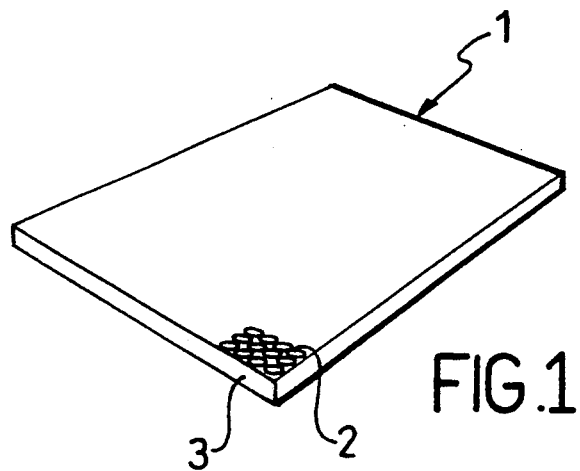
FIG. 1 represents a schematic view of a photostimulable phosphor panel of the structured type.
Figure 2:
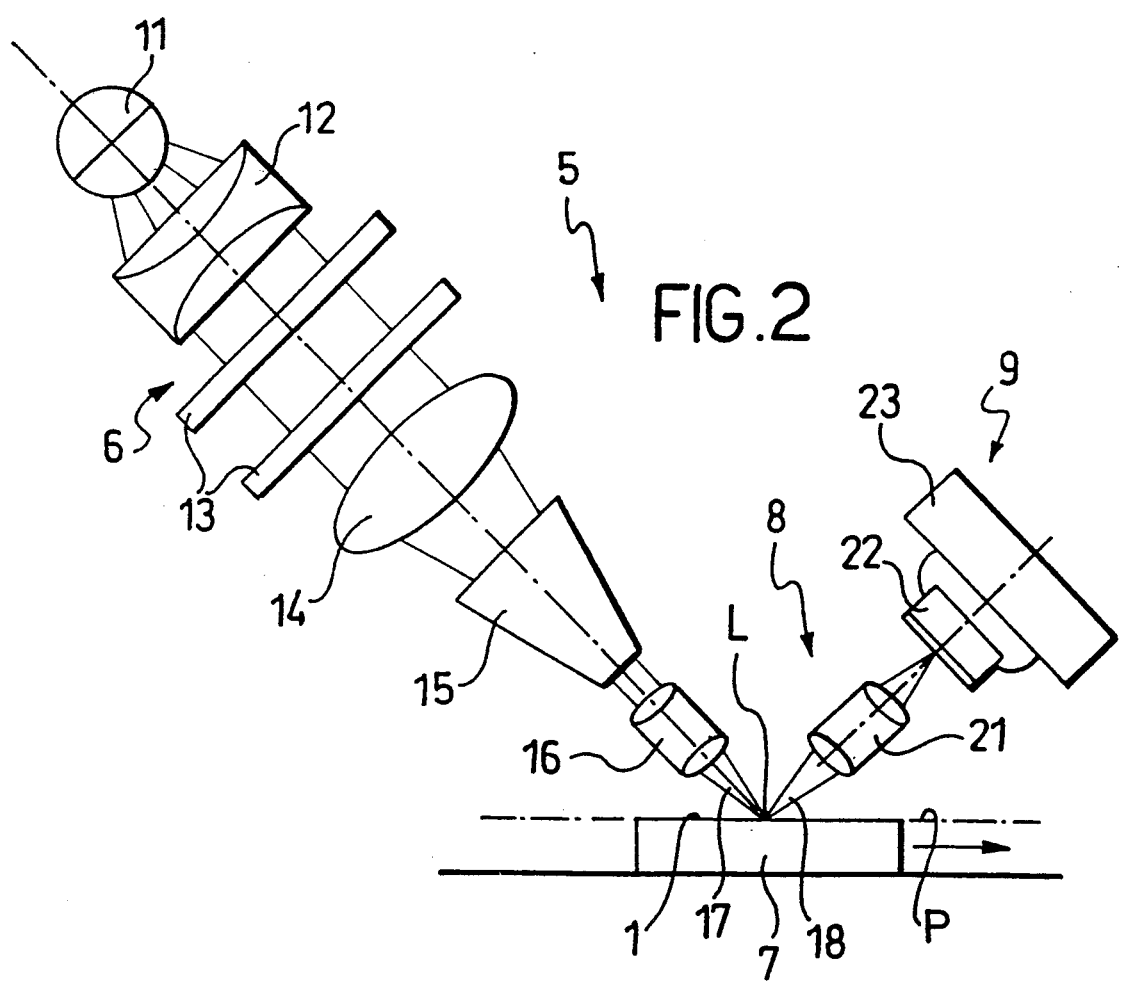
FIG. 2 is a schematic view of an apparatus for reading-out a radiation image stored into the panel of FIG. 1.

In FIG. 1 is illustrated a photostimulable phosphor panel 1 of the structured type; in the panel 1 the phosphor is filled into a plurality of cells 2 ordered in parallel rows in a substrate 3 of inert material.

An apparatus 5 for reading-out a radiation image stored in panel 1 comprises photostimulation means 6, supporting means 7, translation means (not shown), light collection means 8 and conversion means 9.

Photostimulation means 6 comprise a photostimulating light source, such as a QI lamp 11 and optical means (comprising 12, 13, 14, 15 and 16) for focusing the photostimulating light on a scanning plane P, along a scanning line L; such optical means may comprise a condensator 12, various light filters 13, an objective 14, an optical fiber bundle 15 and an array of Selfoc TM microlenses 16, arranged in the indicated order between the lamp 11 and the scanning line L.

Supporting means 7 and translating means (not shown) comprise conventional means, not illustrated in details in the figures. Examples of translating means comprise conveyor belt, rotating drum, sliding plates, etc.

Light collecting means 8 comprise a second array of Selfoc TM microlenses 21; conversion means 9 comprise an array of photodiodes 22 coupled to a relative amplification card 23. The array of Selfoc TM microlenses 21 is arranged between the scanning line L and the array of photodiodes 22. The card 23 is connected to a conventional electronic processing and storing apparatus, not illustrated in the figures.

During operation, the lamp 11, when switched on, produces light which, through the various optical means, is focused onto the scanning line L, contemporaneously and uniformly onto all the points thereof.

On the panel 1, when put onto the supporting means 7, a whole row of cells 2 is struck by the stimulating light 17; the phosphor filled into said lighted cells then emits a photostimulated light 18 according to the image previously stored into the panel.

The photostimulated light 18 produced contemporaneously by all the lighted cells 2 is collected by the array of the Selfoc TM microlenses 21 and transferred to the array of photodiodes 22; the array of photodiodes 22 comprises at least one CCD for each cell 2 belonging to the row along the scanning line L, and produces contemporaeoulsy a plurality of electrical signals, each corresponding to the light emitted by each photostimulated cell 2.

The steps just described are repeated for each and all the rows of cells 2 provided in the panel 1, translating the panel itself so that each row is moved onto the scanning plane P relative to the scanning line L.

We claim:

1. A method for reading-out a radiation image stored in a structured type photostimulable phosphor panel, wherein the phosphor is a plurality of cells ordered in parallel rows into an inert substrate, said method comprising the following steps:
    a) photostimulating contemporaneously and uniformly along a scanning line all the cells belonging to the same row, causing each cell in said row to emit light according to energy stored therein,
    b) collecting the emitted light and converting it into electrical signals, processing contemporaneously and separately the light emitted by each cell along the scanning line,
    c) repeating the above steps for cells of an adjacent row by shifting the panel relative to the scanning line.

2. The method of claim 1 wherein steps a), b) and c) are used so that all rows in said panel are read-out.

3. Apparatus for reading-out a radiation image stored onto a structured type photostimulable phosphor panel, wherein the phosphor is in a plurality of cells ordered in parallel rows in an inert substrate, said apparatus comprising
   a) means for photostimulating the panel along the scanning line, including a photostimulating light source,
   b) means for supporting the panel in a scanning plane containing the scanning line,
   c) means for moving the panel onto the scanning plane relative to the scanning line,
   d) means for collecting the light emitted by the photostimulated panel,
   e) means for converting the light into electrical signals,
said apparatus being characterized by the fact that
   f) the photostimulating means comprise optical means for focusing contemporaneously and uniformly the photostimulating light onto all the cells belonging to the same row along the scanning line, and
   g) said converting means are such as to convert contemporaneously and separately the light emitted by each photostimulated cell.

4. Apparatus according to claim 3, wherein the photostimulating light source is a quartz-iodide lamp.

5. Apparatus according to claim 3, wherein the photostimulating light source is a light emitting diode array.

6. Apparatus according to claim 3, wherein the photostimulating light source is a laser beam.

7. Apparatus according to claim 3, wherein the optical means comprise an optical fiber bundle.

8. Apparatus according to claim 3, wherein the optical means comprise an array of microlenses.

9. Apparatus according to claim 6, wherein the optical means comprise a plurality of prismatic lenses.

10. Apparatus according to claim 3, wherein said collecting means comprise an optical fiber bundle, including at least one fiber for each cell of the panel belonging to the row along the scanning line.

11. Apparatus according to claim 3, wherein said collecting means comprise an array of microlenses, including at least one microlens for each cell of the panel belonging to the row along the scanning line.

12. Apparatus according to claim 3, wherein said converting means comprise a plurality of charge coupled devices (CCD), including at least one charge coupled device (CCD) for each cell of the panel belonging to the row along the scanning line.

13. Apparatus according to claim 12, wherein the CCD are bounded into an array of CCD.

14. Apparatus according to claim 3, wherein said concerting means comprise a plurality of contact photodiodes, including at least one photodiode for each cell of the panel belonging to the row along the scanning line.

15. Apparatus according to claim 14, wherein the contact photodiodes are bounded into an array of photodiodes.

* * * * *